United States Patent [19]

Matsumura

[11] Patent Number: 4,853,867
[45] Date of Patent: Aug. 1, 1989

[54] SIMULTANEOUS FOUR-AXIS LATHE MACHINING TIME BAR-GRAPH DISPLAY METHOD

[75] Inventor: Teruyuki Matsumura, Tokyo, Japan
[73] Assignee: Fanuc Ltd, Minamitsuru, Japan
[21] Appl. No.: 112,714
[22] PCT Filed: Feb. 17, 1987
[86] PCT No.: PCT/JP87/00100
  § 371 Date: Oct. 20, 1987
  § 102(e) Date: Oct. 20, 1987
[87] PCT Pub. No.: WO87/04961
  PCT Pub. Date: Aug. 27, 1987

[30] Foreign Application Priority Data

Feb. 25, 1986 [JP] Japan ................... 61-039809

[51] Int. Cl.⁴ .................. G06F 15/46; G05B 19/18
[52] U.S. Cl. ............... 364/474.22; 82/118;
  364/474.02; 364/474.11; 340/722
[58] Field of Search ............. 364/474.22–474.27,
  364/188, 189, 191–193; 82/2 B, 3, 12, 14 E, 25,
  36 R, 36 A; 318/567, 568, 569; 340/722, 753,
  754

[56] References Cited

U.S. PATENT DOCUMENTS 4,424,569 1/1984 Imazeki et al. ........... 364/474.28 X
4,586,125 4/1986 Takagawa ............... 364/474.22 X
4,680,697 7/1987 Kiya et al. ............... 364/474.22 X
4,723,207 2/1988 Isobe et al. .............. 364/474.22 X

FOREIGN PATENT DOCUMENTS 2118328 10/1983 United Kingdom .

Primary Examiner—Joseph Ruggiero
Attorney, Agent, or Firm—Staas & Halsey

[57] ABSTRACT

When NC programs of a simultaneous four-axis lathe have been prepared, a processor (11) obtains the machining times $T_{1i}$, $T_{2i}$ of synchronized processes for each tool rest and obtains total machining time $T_m$ for machining performed by the simultaneous four-axis lathe by using the longer of the machining times for those synchronized processes carried out simultaneously by the tool rests. Next, the total machining time $T_m$ is divided by the number of characters C in the horizontal direction of a CRT (16d) used in displaying bar graphs, to calculate machining time t per character. The machining time of each synchronized process is divided by the obtained machining time t per character, to determine the number of characters necessary for displaying each machining time. Thereafter, the machining time for each tool rest is displayed in the form of a bar graph on the display screen of the CRT (16d) by allotting character patterns for bar graph display stored beforehand in a character generator (16b) to the numbers of characters and respective machining times.

7 Claims, 7 Drawing Sheets

Fig. 2
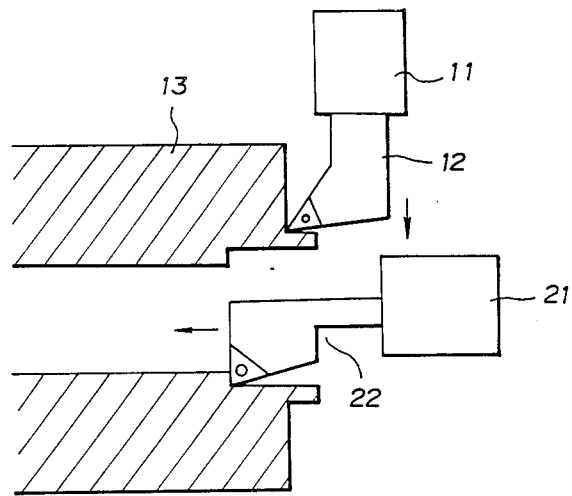
Fig. 5(A)　　Fig. 5(B)　　Fig. 5(C)
　　

Fig. 3
PRIOR ART

☆☆☆ NC DATA CREATION ☆☆☆          MACHINING TIME

|  | (TOOL REST 1) | | (TOOL REST 2) | |
|---|---|---|---|---|
| NO. | CUTTING | RAPID-TRAVERSE | CUTTING | RAPID-TRAVERSE |
| 01 DRILLING | 0'30 | 0'09 | | |
| 02 OUTER DIAMETER ROUGHING | | | 0'18 | 0'07 |
| 03 OUTER DIAMETER ROUGHING | | | 0'55 | 0'18 |
| INNER DIAMETER ROUGHING | 1'10 | 0'18 | | |
| 05 OUTER DIAMETER FINISHING | | | 0'32 | 0'16 |
| INNER DIAMETER FINISHING | 0'21 | 0'10 | | |
| 07 THREAD CUTTING | 0'25 | 0'07 | | |
| TOTAL TIME | 2'55 | 0'57 | | |

Fig.7

| SYNCHRONIZED PROCESS NO. | PROCESS NAME | TIME | | NUMBER OF CHARACTERS | |
|---|---|---|---|---|---|
| | | FIRST TOOL REST | SECOND TOOL REST | FIRST TOOL REST | SECOND TOOL REST |
| 01 | DRILLING | 39 (0'30, 0'09) | | 13 | |
| 02 | OUTER DIAMETER ROUGHING | | 25 (0'18, 0'07) | | 10 |
| 03 | OUTER DIAMETER ROUGHING / INNER DIAMETER ROUGHING | 88 (1'10, 0'18) | 73 (0'05, 0'18) | 30 | 25 |
| 04 | OUTER DIAMETER FINISHING / INNER DIAMETER FINISHING | 31 (0'21, 0'10) | 48 (0'32, 0'16) | 10 | 17 |
| 05 | THREAD CUTTING | 32 (0'25, 0'07) | | 11 | |
| TOTAL | | 232 (2'55, 0'57) | | | |

SIMULTANEOUS FOUR-AXIS LATHE MACHINING TIME BAR-GRAPH DISPLAY METHOD

CROSS-REFERENCE TO RELATED APPLICATION

This application is related to U.S. application Ser. No. 103,581, filed Aug. 3, 1987 which is assigned to the assignee of the subject application.

BACKGROUND OF THE INVENTION

1. Technical Field

This invention relates to a method of displaying the machining time of a simultaneous four-axis lathe and, more particularly, to a simultaneous four-axis lathe machining time display method for displaying, in the form of a bar graph, the machining time of each tool rest of the lathe using a character display unit.

2. Background Art

An NC four-axis lathe is provided with first and second NC programs corresponding to respective ones of first and second tool rests and having queuing commands. While synchronization is achieved by the queuing commands, movement of the corresponding tool rests is controlled independently by the first and second NC programs to subject a workpiece to machining.

FIG. 1 shows an example of first and second NC programs 1, 2 of this type. The programs respectively include program numbers 1a, 2a, program portions 1b, 2b for executing a first machining operation, first queuing commands 1c, 2c, program portions 1d, 2d for executing a second machining operation, second queuing commands 1e, 2e, program portions 1f, 2f for executing a third machining operation, third queuing commands 1g, 2g, program portions 1h, 2h for executing a fourth machining operation, fourth queuing commands 1i, 2i, program portions 1j, 2j for executing a fifth machining operation, and tape end commands 1k, 2k.

In accordance with the first and second NC programs 1, 2, the first and second tool rests machine a workpiece simultaneously (simultaneous independent operation) according to the program portions 1b, 2b, and, in response to the first queuing command "M100", the tool rest which finishes the machining operation first waits until the other NC controller reads in the first queuing command "M100".

When the other NC controller reads in "M100", the simultaneous independent operation is performed according to the program portions 1d, 2d. In response to the second queuing command "M200", the tool rest which finishes the machining operation first waits until the other NC controller reads in the second queuing command "M200".

When the other NC controller reads in "M200", the simultaneous independent operation is performed according to the program portions 1f, 2f. Note that since the program portion 1f is blank, the first tool rest immediately assumes a waiting state in response to the third queuing command "M300", and only the second tool rest performs machining according to the program portion 2f.

When machining by the second tool rest ends and the third queuing command "M300" is read in, the simultaneous independent operation starts in accordance with the program portions 1h, 2h. Thereafter, this four-axis lathe control is performed in a similar manner, with simultaneous four-axis machining being ended in response to the tape end commands M30.

Thus, with a four-axis lathe having two tool rests, the tool rests can be controlled and moved independently. Such a lathe is advantageous in that e.g. the outer diameter of a workpiece 13 can be cut by a tool 12 mounted on one tool rest 11 (see FIG. 2) and the inner diameter of the workpiece can be cut by a tool 22 mounted on the other tool rest 21. This enables machining time to be curtailed.

The NC programs of such a simultaneous four-axis lathe are prepared automatically in conversational fashion by the automatic programming function of an NC unit or by a separately provided automatic programming unit. It is arranged so that the machining times involved in the synchronized processes performed by the tool rests in accordance with the prepared NC programs can be displayed. It should be noted that a "synchronized process" refers to a machining process executed from one queuing command to the next.

FIG. 3 is an example of a display according to the prior art showing the cutting time and rapid-traverse time of each tool rest in each of the synchronized processes. In FIG. 3, NO. represents a synchronized process number. A process extending from an i-th queuing command to the next queuing command shall be referred to as an i-th synchronized process.

In FIG. 3, the first synchronized process is drilling performed solely by tool rest 1. The cutting time displayed for this process is 30 seconds, and that for the rapid-traverse time is 9 seconds.

The second synchronized process is outer diameter roughing performed solely by the tool rest 2, for which the cutting time displayed is 18 seconds and the rapid-traverse time 7 seconds.

The third synchronized process involves inner diameter roughing and outer diameter roughing performed simultaneously by the first and second tool rests 1, 2, respectively. The cutting time and rapid-traverse time displayed for inner diameter roughing are 1 minute 10 seconds and 18 seconds, respectively, and the cutting time and rapid-traverse time displayed for outer diameter roughing are 55 seconds and 18 seconds, respectively. The machining times for the other synchronized processes performed by the tool rests are displayed in a similar manner.

Displayed lastly are the total cutting time and total rapid-traverse time using the longer of the cutting and rapid-traverse times of the processes performed simultaneously by the tool rests 1 and 2.

With this conventional method of displaying machining times, however, the machining time of each synchronized machining process performed by each lathe is displayed in the form of characters. For this reason, the displayed times are difficult to read and it is difficult to ascertain where time is being wasted and to what extent machining is being performed simultaneously.

SUMMARY OF THE INVENTION

Accordingly, an object of the present invention is to provide a simultaneous four-axis lathe machining time display method which displays time in an easily readable manner and which makes it possible to readily ascertain where time is being wasted and to what extent machining is being performed simultaneously.

Another object of the present invention is to provide a simultaneous four-axis lathe machining time display method for displaying the machining time of each tool rest in the form of a bar graph.

A further object of the present invention is to provide a machining time display method through which the machining time of each tool rest can be displayed as a bar graph on a character display unit not having a graphic function.

When the NC programs of a simultaneous four-axis lathe have been conversationally prepared, the machining times of synchronized processes are obtained for each tool rest, and total machining time for machining performed by the simultaneous four-axis lathe is obtained by using the longer of the machining times for the synchronized processes in which machining is carried out simultaneously by the tool rests. Next, the total machining time is divided by the number of characters in the horizontal direction (e.g. the number of characters on one line) of the display screen used when displaying the machining times of the tool rests as bar graphs, thereby calculating machining time per character. Thereafter, the machining time of each synchronized process is divided by the obtained machining time per character, thereby determining the number of characters $N_i$ necessary for displaying the machining time of each process.

When the number of characters has been obtained, $N_i$-number of character patterns for bar graph display are used to display, in the form of bar graphs, the machining times for each tool rest.

BRIEF DESCRIPTION OF THE DRAWINGS

FIG. 2 is a diagram for describing an NC four-axis lathe;

FIG. 3 shows an example of a conventional machining time display;

FIGS. 5(A), 5(B) and 5(C) are diagrams of examples of character patterns for a bar graph display;

FIG. 7 is a chart illustrating machining times and character numbers, which are stored in a working memory, for each tool rest in each synchronized process.

DESCRIPTION OF THE PREFERRED EMBODIMENT

Figure 1:
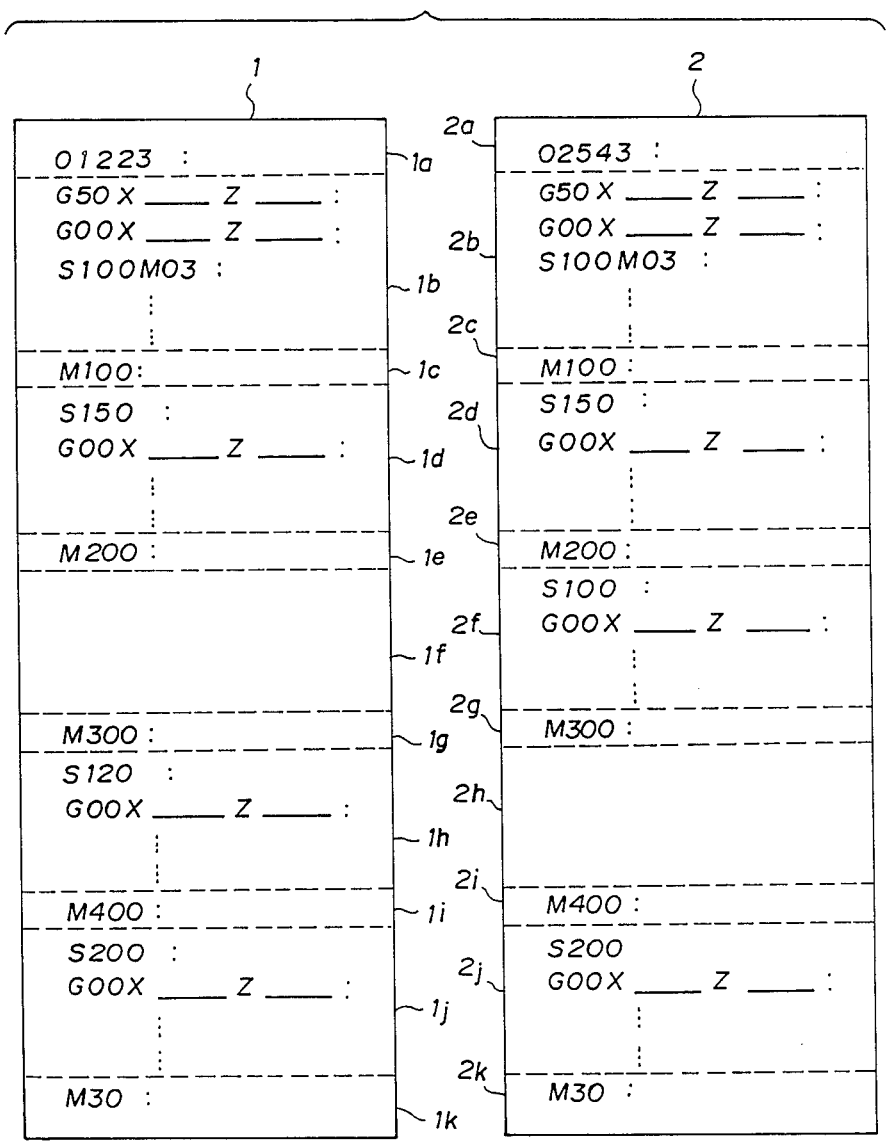
FIG. 1 is a diagram of first and second NC programs in an NC four-axis lathe.
Figure 4:
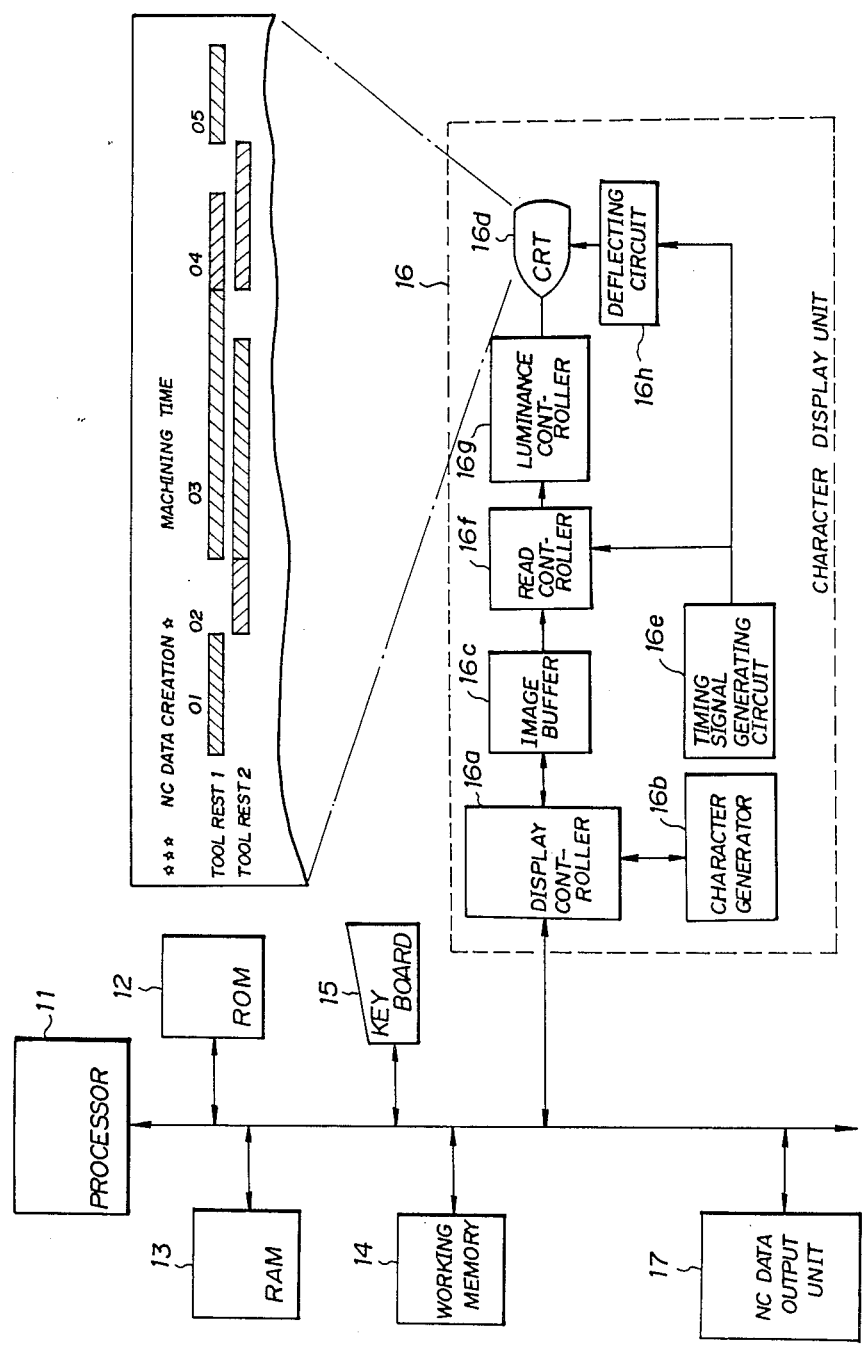
FIG. 4 is a block diagram of an automatic programming apparatus for practicing the method of the present invention.

FIG. 4 is a block diagram of an automatic programming apparatus for practicing the method of the present invention.

Numeral 11 denotes a processor, 12 a ROM, 13 a RAM, 14 a working memory, 15 a keyboard, 16 a character display unit, and 17 an NC data output unit.

The character display unit 16 has a display controller 16a, a character generator 16b for storing various character patterns inclusive of bar graph display character patterns and for outputting a predetermined pattern, an image buffer 16c for storing one frame of a character image, a CRT 16d, a timing signal generator 16e for generating a horizontal synchronizing signal and a vertical synchronizing signal, a read controller 16f for reading and outputting character images from the image buffer 16 in synchronism with beam scanning of the CRT 16d by means of raster scanning, a luminance modulating controller 16g for carrying out luminance modulation control based on a picture signal outputted by the read controller 16f, and a deflecting circuit 16h for deflecting the beam horizontally and vertically in synchronism with the timing signal outputted by the timing signal generator 16e. The image buffer 16c has a single storage area corresponding to one pixel of the image displayed on the CRT display screen. The arrangement is such that an image is read out of the image buffer 16c pixel by pixel by means of the read controller 16f.

The character generator 16b is constituted by a ROM and stores an ($n \times m$)-bit character pattern corresponding to each character code. As shown in FIGS. 5(A) through (C), the character generator 16b also stores, in correspondence with a predetermined code, a paint pattern (FIG. 5(A)) or hatched pattern (FIGS. 5(B), 5(C)) for a bar graph display.

Figure 6:
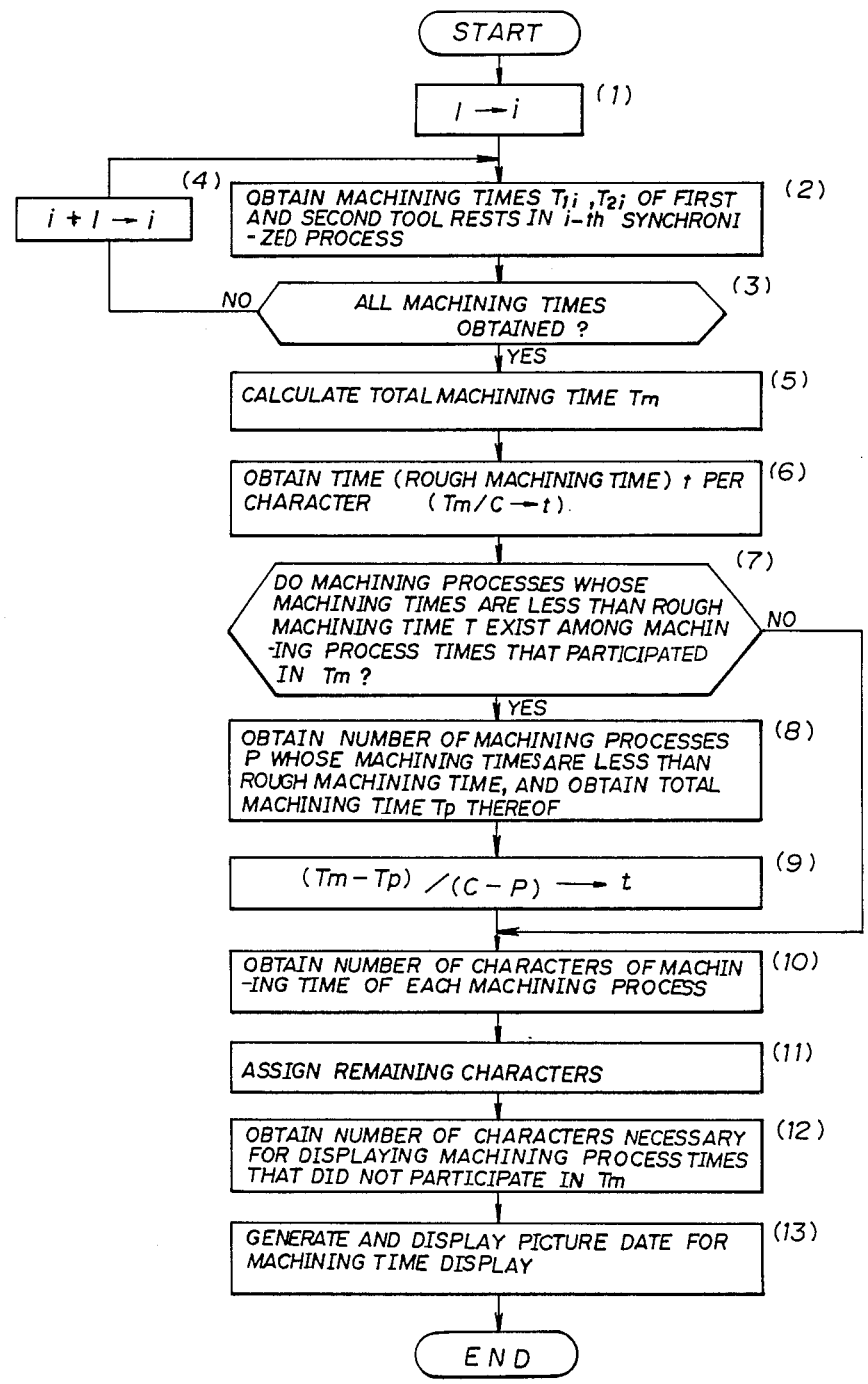
FIG. 6 is a flowchart of processing in accordance with the invention.

FIG. 6 is a flowchart of processing illustrating the machining timing display method of the present invention. The method of the invention will now be described with reference to this flowchart.

When data necessary for creating NC programs are inputted conversationally using the keyboard 15 and display unit 16, the processor 11 uses these data to create the NC programs and display tool paths on the CRT 16d.

The processor 11 executes the following processing concurrently while the tool paths are being displayed:

(1) First, the operation 1→i is performed.

(2) Next, machining times $T_{1i}$, $T_{2i}$ of first and second tool rests for an i-th synchronized process are determined.

It should be noted that "machining time" referred to here is the sum of cutting time and rapid-traverse time. Accordingly, cutting time is obtained from cutting velocity and cutting distance, rapid-traverse time is obtained from rapid-traverse velocity and traveling distance covered during rapid-traverse, and machining time is determined by taking the sum of these two times. Each machining time is stored in the working memory 14.

(3) When the machining times $T_{1i}$, $T_{2i}$ have been obtained, it is checked whether the machining times for all of the synchronized processes have been calculated.

(4) If the machining times for all of the synchronized processes have not been calculated, then the operation i+1→i is performed and processing is repeated from step (2) onward. If these machining times have been calculated, then the processing set forth below is executed. It should be noted that by virtue of the foregoing, the names of the processes as well as the machining times, cutting times and rapid-traverse times of the first and second tool rests are stored in the working memory 14 to correspond with the synchronized process numbers, as shown in FIG. 7 (cutting times are shown in the parentheses on the left side, and rapid-traverse times are shown in the parentheses on the right side).

(5) When the machining times $T_{1i}$, $T_{2i}$ of each synchronized process have been determined, these are used to calculate the total machining time $T_m$.

The total machining time $T_m$ is found by using the machining times of the individual tool rests for those synchronized processes performed solely by one tool rest or the other, and, for those synchronized processes performed by both tool rests simultaneously, using the longer of these machining times.

(6) If a request to display machining times is received from the keyboard 15 under these conditions, the processor 11 calculates time (rough machining time) per character in accordance with the equation $$T_m/C \to t \tag{a}$$

where C represents the number of characters (e.g. the number of characters on one line) of the CRT 16d used when displaying machining time in the form of a bar graph.

(7) When the rough machining time t has been found, whether or not machining processes whose times are less than the rough machining time t exist is checked with regard to the machining time $T_i$ that participated in the calculation of the total machining time $T_m$.

(8) If such a machining process does exist, the number P of the processes whose machining times are less than the rough machining time and the total machining time $T_p$ of these processes are calculated.

(9) Next, a new time (rough machining time) t per character is calculated in accordance with the equation $$(T_m - T_p)/(C - P) \to t \tag{b}$$

(10) After the new rough machining time t is calculated, or when it is found at step (7) that a synchronized process whose machining time is less than that of the rough machining time does not exist, the arithmetic operation indicated by the equation $$T_i/t \to C_{ji} \tag{c}$$

is executed and the remainder is also stored in memory.

In the above equation, $T_i$ represents the machining time of the i-th synchronized process that participated in the calculation of the total machining time $T_m$, and the quotient is the number of characters necessary for displaying, in the form of a bar graph, the machining time $T_i$ of the i-th synchronized process. If the quotient is zero, the number of characters is regarded as being one, and the remainder is made zero.

(11) When the numbers of characters for all of the synchronized processes have been obtained through step (10), the total value thereof is subtracted from the number of characters C and the remaining characters are assigned one by one starting from the largest of the remainders stored in step (10).

(12) Thereafter, Eq. (c) is used to obtain the number of characters for displaying the machining times of the synchronized processes that did not participate in the calculation of the total machining time $T_m$. If a quotient is zero, the number of characters is made one.

As a result of the foregoing, the number of characters for each tool rest is obtained in correspondence with each synchronized process number, as shown in FIG. 7. The examples of the numerical values shown in FIG. 7 are for a case C=80.

(13) When the numbers of characters have been found, the processor 11 allots the patterns for bar graph display stored in the character generator 16b to the numbers of characters and their respective machining times, generates character code data which will cause the machining times of each tool rest to be displayed as bar graphs and will cause the machining times to be displayed as characters on the CRT display, and sends these data to the display controller 16a.

The display controller 16a causes the character generator 16b to successively generate character patterns conforming to the character code data received from the processor 11, and stores these character patterns in the image buffer 16c. Thus, one frame of a machining time display image is stored in the image buffer 16c.

Thereafter, the machining time display image is read out by the read controller 16f in synchronism with the raster scanning of the beam and is displayed on the CRT 16d.

Figure 8:
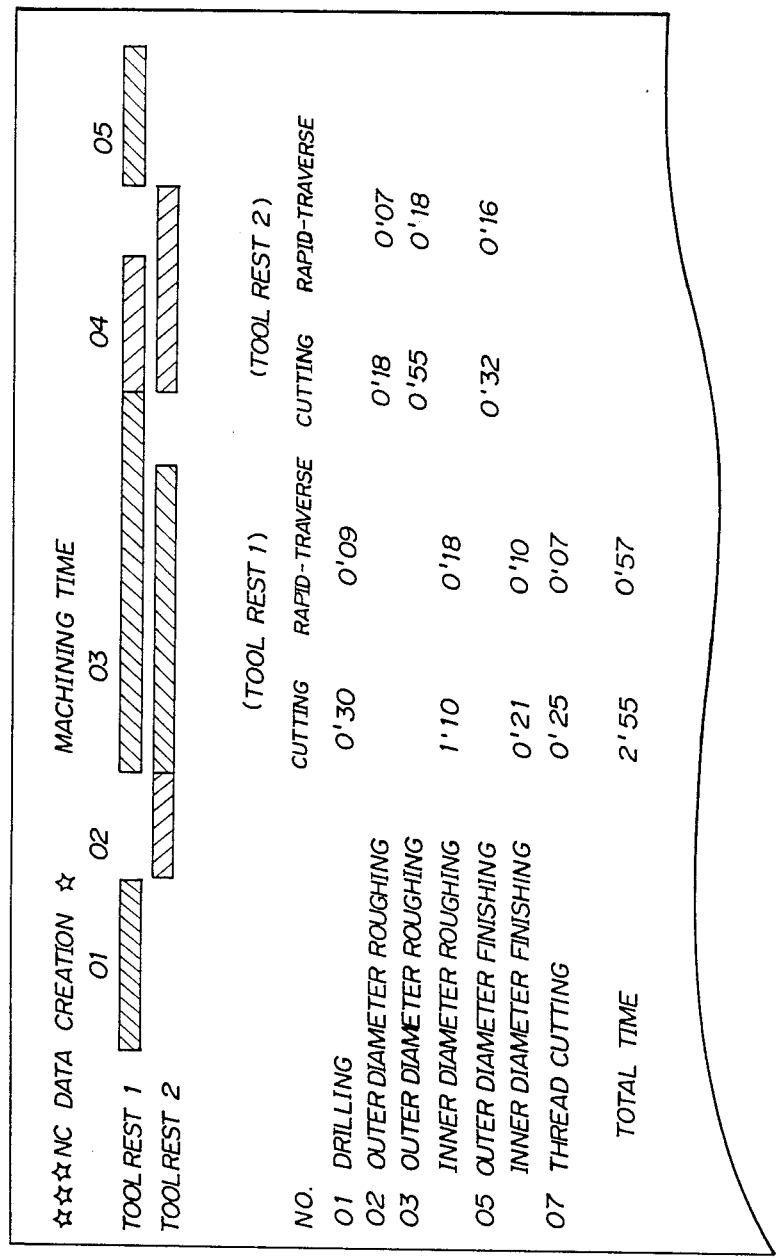
FIG. 8 shows an example of a display of machining times in accordance with the invention.

FIG. 8 is an example of a machining time display according to the present invention. The machining time for each synchronized process performed by the respective tool rest is displayed as a bar graph, and the machining times are also displayed in the form of characters as in the prior art.

When the bar graphs indicating the machining times of an i-th synchronized process and the next synchronized process are continuous, the patterns of the continuous bar graphs are made different from each other or, if the CRT is a color CRT, they are displayed in different colors.

Thus, in accordance with the present invention, the arrangement is such that the machining times of the synchronized processes performed by the tool rests of a simultaneous four-axis lathe are displayed over the full screen as bar graphs and not just in the form of characters. This provides an easily readable display and makes it possible to ascertain where time is being wasted, and to what extent machining processes are being performed simultaneously.

Further, in accordance with the invention, a character generator is used to display the bar graphs. It is therefore possible to display machining times in a simple manner even when the machining time display based on characters and the machining time display based on bar graphs are mixed.

What is claimed is:

1. In a machining time display method for displaying, in the form of bar graphs, machining times of each tool rest for every synchronized process in a simultaneous four-axis lathe in which there is provided first and second NC programs corresponding to first and second tool rests, wherein the first and second NC programs have queuing commands, wherein a workpiece is machined by controlling movement of the first and second tool rests independently in accordance with the first and second NC programs, respectively, while synchronization is achieved by said queueing commands, said method comprising the steps of:

(a) obtaining a total machining time $T_m$ of machining performed by the simultaneous four-axis lathe by determining and storing machining times $T_{1i}$, $T_{2i}$ for each synchronized process of the first and second tool rests and using the longer of the machining times of each of the synchronized processes which are carried out simultaneously by both the first and second tool rest to calculate the total machining time $T_m$;

(b) calculating machining time per character by dividing said total machining time $T_m$ by a number of characters C used for bar graph display;

(c) determining a number of characters necessary for displaying the machining time of each synchronized process by dividing the machining time of each of the synchronized processes by the obtained machining time per character; and (d) displaying the machining time for each of the first and second tool rests in the form of a bar graph by allotting patterns for bar graph display stored beforehand in a character generator to the calculated numbers of characters and respective machining times.

2. A simultaneous four-axis lathe machining time display method according to claim 1, wherein said step (b) includes the steps of:
   (b1) determining a rough machining time per character by dividing the total machining time $T_m$ by the number of character C;
   (b2) checking whether there exist any processes whose machining times are less than the rough machining time by checking the machining times that were used to calculate the total machining time $T_m$ in said step (a), calculating a number of processes P whose machining times are less than the rough machining time and calculating a total machining time $T_p$ of these process; and
   (b3) calculating a true machining time t per character in accordance with the following equation:

$$(T_m - T_p)/(C - P) \rightarrow t.$$

3. A simultaneous four-axis lathe machining time display method according to claim 2, wherein said step (c) includes the steps of:
   (c1) obtaining a quotient and a remainder by dividing a machining time $T_i$ of each synchronized process corresponding to one of the machining times used to calculate the total machining time $T_m$ in said step (a), by the machining time t per character;
   (c2) adopting the quotient as the number of characters necessary for displaying the machining time $T_i$ in the form of a bar graph, and allotting one character to a process for which the quotient is zero;
   (c3) obtaining a difference between a total value C' of the numbers of characters in all of the synchronized processes and the numbers of characters C;
   (c4) assigning, one by one, a number of characters equivalent to the difference obtained in said step (c3) to synchronized process for which said remainders are greater than a predetermined number; and
   (c5) obtaining a number of characters necessary for said machining time display by dividing the machining time of each synchronized process which was not used to calculate the total machining $T_m$ in said step (a) by the machining time t per character.

4. A simultaneous four-axis lathe machining time display method according to claim 1, wherein said step (d) comprises displaying bar graphs of contiguous synchronized processes which are continuous, such that the patterns for the bar graphs differ from each other to display a boundary between the bar graphs which is distinguishable.

5. A method of displaying machining times of synchronized processes in a machine tool having first and second tool rests controlled by first and second NC programs, respectively, comprising the steps of:
   (a) determining, for each synchronized process, the one of the first and second tool rests having the longer machining time;
   (b) obtaining a total machining time by adding the longer machining time for each synchronized process as determined in said step (a), to obtain a total machining time;
   (c) calculating a machining time per character by dividing the total machining time determined in said step (b) by a number of characters used for a bar graph display;
   (d) dividing the machining times of each of the synchronized processes for each of the first and second tool rests by the machining time per character calculated in said step (c) to determine a number of characters necessary for displaying the machining times of each of the synchronized processes; and
   (e) displaying the machining times of the synchronized processes for each of the first and second tool rests in the form of a bar graph based on the number of characters for each synchronized process determined in said step (d).

6. A method according to claim 5, wherein said step (c) includes the substeps of:
   (c1) dividing the total machining time determined in said step (b) by the total number of characters, to determine a rough machining time per character;
   (c2) determining whether any of the synchronized processes included in the total machining time obtained in said step (b) have machining times which are less than the rough machining time;
   (c3) calculating the number of synchronized processes whose machining times are less than the rough machining time, and the total machining time of these short synchronized processes; and
   (c4) calculating a true machining time per character based on the total machining time determined in said step (b), the total machining time of the short synchronized processes determined in said substep (c3), the number of characters, and the number of synchronized processes.

7. A method according to claim 5, wherein said step (e) comprises displaying bar graphs of contiguous synchronized processes which are continuous in a manner such that the patterns for the bar graphs differ from each other to display a boundary between the bar graphs which is distinguishable.

* * * * *

UNITED STATES PATENT AND TRADEMARK OFFICE
CERTIFICATE OF CORRECTION

PATENT NO. : 4,853,867

DATED : AUGUST 1, 1989

INVENTOR(S) : TERUYUKI MATSUMURA

It is certified that error appears in the above-identified patent and that said Letters Patent is hereby corrected as shown below:

Col. 6, line 46, "queueing" should be --queuing--;

line 55, "rest" should be --rests--.

Signed and Sealed this

Twelfth Day of June, 1990

Attest:

HARRY F. MANBECK, JR.

Attesting Officer

Commissioner of Patents and Trademarks